(12) United States Patent
Sun et al.

(10) Patent No.: US 11,718,321 B2
(45) Date of Patent: Aug. 8, 2023

(54) VEHICLE-MOUNTED CAMERA GIMBAL SERVO SYSTEM AND CONTROL METHOD

(71) Applicant: Beijing Institute of Technology, Beijing (CN)

(72) Inventors: Chao Sun, Beijing (CN); Jianghao Leng, Beijing (CN)

(73) Assignee: Beijing Institute of Technology, Beijing (CN)

( * ) Notice: Subject to any disclaimer, the term of this patent is extended or adjusted under 35 U.S.C. 154(b) by 0 days.

(21) Appl. No.: 17/280,390

(22) PCT Filed: Jul. 13, 2020

(86) PCT No.: PCT/CN2020/101591
§ 371 (c)(1),
(2) Date: Mar. 26, 2021

(87) PCT Pub. No.: WO2021/098238
PCT Pub. Date: May 27, 2021

(65) Prior Publication Data
US 2022/0306157 A1  Sep. 29, 2022

(30) Foreign Application Priority Data
Nov. 22, 2019  (CN) .......................... 201911152526.0

(51) Int. Cl.
*B60W 60/00* (2020.01)
*B60W 40/10* (2012.01)

(52) U.S. Cl.
CPC ........ *B60W 60/0015* (2020.02); *B60W 40/10* (2013.01); *B60W 2420/42* (2013.01); *B60W 2422/10* (2013.01)

(58) Field of Classification Search
None
See application file for complete search history.

(56) References Cited

U.S. PATENT DOCUMENTS 6,630,950 B1   10/2003  Ohkawara et al.

FOREIGN PATENT DOCUMENTS

| CN | 101858781 A | 10/2010 |
| CN | 103148324 A | 6/2013 |

(Continued)

OTHER PUBLICATIONS

English Translation for CN 103148324B translated by Google Patents from Chinese into English (Year: 2013).*

*Primary Examiner* — Thomas E Worden
(74) *Attorney, Agent, or Firm* — Fox Rothschild LLP (57) ABSTRACT

Disclosed are a vehicle-mounted camera gimbal servo system and a control method. The vehicle-mounted camera gimbal servo system includes a camera tri-axial gimbal and a servo control apparatus. The camera tri-axial gimbal includes a pitch motor, a roll motor, a yaw motor, a roll arm (1), a pitch arm (4), a yaw arm (5), a gimbal top (7), a camera (11), a pitch-axis bearing (12), and a counterweight block (13); the pitch motor includes a pitch motor stator (2) and a pitch motor rotor (3); the yaw motor includes a yaw motor stator (6) and a yaw motor rotor (8); the roll motor includes a roll motor stator (9) and a roll motor rotor (10); the servo control apparatus includes an inertial measurement unit, a three-dimensional modeling control unit, an angular velocity loop control unit, and an angular displacement loop control unit.

20 Claims, 3 Drawing Sheets

(56) References Cited

FOREIGN PATENT DOCUMENTS

| CN | 103148324 B | * | 4/2015 |
| CN | 206039292 U |  | 3/2017 |
| CN | 108705980 A |  | 10/2018 |
| CN | 110794877 A |  | 2/2020 |

* cited by examiner

| Measure angular velocity information and angular displacement information of a camera by using an inertial measurement unit mounted on the camera, and generate precise angular displacement information by using a quaternion complementary filtering algorithm | A |

| Establish Simulink models in three directions of pitch, roll and yaw according to a mechanical structure of a camera tri-axial gimbal in combination with parameters of a pitch motor, a roll motor, and a yaw motor; generate IGBT switching sequence information of a drive bridge according to position sensors in the motors; generate an IGBT duty cycle of the drive bridge based on target voltage information, and implement open-loop control of motor speeds in the three directions of pitch, roll and yaw by using the drive bridge, to obtain an actuator control model, that is, a Simulink control model of the pitch motor, the roll motor, and the yaw motor | B |

| Establish an angular velocity loop controller model in Simulink based on the actuator control model, and optimize parameters of the angular velocity loop controller model iteratively by using a particle swarm optimization algorithm, to obtain a parameter-optimized angular velocity loop controller model | C |

| Establish an angular displacement loop controller model in Simulink based on the angular velocity loop controller model, and optimize parameters of the angular displacement loop controller model by using a particle swarm optimization method, to obtain a parameter-optimized angular displacement loop controller model | D |

| Generate, by using the parameter-optimized angular displacement loop controller model, target angular velocity information according to target steering information set by a user and the actual angular displacement information obtained by the inertial measurement unit; generate, by using the parameter-optimized angular velocity loop controller model, target voltage information according to a combination of the actual angular velocity information obtained by the inertial measurement unit and the target angular velocity information; generate IGBT switching sequence information of the drive bridge in the three directions according to the position sensors in the pitch motor, the yaw motor, and the roll motor; and generate an IGBT duty cycle of the drive bridge in the three directions based on the target voltage information | E |

FIG. 5

VEHICLE-MOUNTED CAMERA GIMBAL SERVO SYSTEM AND CONTROL METHOD

CROSS-REFERENCE TO RELATED APPLICATIONS

This application is a national phase of International Patent Application No. PCT/CN2020/101591, filed Jul. 13, 2020, which claims priority to Chinese Patent Application No. 201911152526.0, filed Nov. 22, 2019, which are incorporated herein by reference in its entirety.

TECHNICAL FIELD

The present disclosure relates to the technical field of vehicle-mounted cameras, and in particular, to a vehicle-mounted camera gimbal servo system and a control method.

BACKGROUND

The safety of driverless vehicles has been a hot issue in this field. As vision sensors, cameras provide a large amount of data information for driverless vehicles. However, due to factors such as an uneven road surface, steering, braking, and acceleration, a vehicle has various uncertain attitude changes during actual driving, which become disturbance factors for camera operation. In order to ensure the stability and continuity of video data, a tri-axial gimbal for a vehicle-mounted camera is developed, which is a three-axis rotatable mechanical structure. Unlike cameras in the fields of UAV aerial photography and handheld photography, a driverless camera is the key equipment to realize a driverless function. Therefore, it is important to improve the stability of the camera tri-axial gimbal for the safety of driverless vehicles.

SUMMARY

The present disclosure aims to overcome the deficiencies of the prior art and provide a vehicle-mounted camera gimbal servo system and a control method, to improve dynamic performance and anti-disturbance performance of real-time control of the camera tri-axial gimbal servo system and guarantee the safety of a driverless vehicle.

To achieve the above objective, the present disclosure provides the following solutions:

A vehicle-mounted camera gimbal servo system includes a camera tri-axial gimbal and a servo control apparatus, where the camera tri-axial gimbal includes a pitch motor, a roll motor, a yaw motor, a roll arm (1), a pitch arm (4), a yaw arm (5), a gimbal top (7), a camera (11), a pitch-axis bearing (12), and a counterweight block (13); the pitch motor includes a pitch motor stator (2) and a pitch motor rotor (3); the yaw motor includes a yaw motor stator (6) and a yaw motor rotor (8); the roll motor includes a roll motor stator (9) and a roll motor rotor (10);

the camera (11) is fixedly connected to the pitch motor rotor (3) through the pitch arm (4), and the pitch motor rotor (3) is used for implementing movement in a pitch direction; the counterweight block (13) is connected on the pitch arm (4) in a threaded manner, to compensate for a gravitational unbalance moment in a roll direction caused by the self-weight of the pitch motor; the pitch arm (4) is constrained by the pitch-axis bearing (12); the pitch motor stator (2) is fixedly connected to the roll motor rotor (10) through the roll arm (1), and the roll motor rotor (10) is used for implementing movement in the roll direction; the roll motor stator (9) is fixedly connected to the yaw motor rotor (8) through the yaw arm (5); the yaw motor rotor (8) is used for implementing movement in a yaw direction; the yaw motor stator (6) is fixedly connected to the gimbal top (7), and the gimbal top (7) is fixed on a side of a fixing position of an inner rear view mirror on an inner top portion of a vehicle, so that the whole camera tri-axial gimbal is fixedly connected to the inner top portion of the vehicle; position sensors are disposed inside the pitch motor, the roll motor and the yaw motor;

the servo control apparatus includes:

an inertial measurement unit, mounted on the camera (11), configured to measure angular velocity information and angular displacement information of the camera (11), and generate precise angular displacement information by using a quaternion complementary filtering algorithm;

an actuator control unit, configured to generate IGBT switching sequence information of a drive bridge in three directions according to the position sensors in the pitch motor, the yaw motor, and the roll motor; and generate an IGBT duty cycle of the drive bridge in the three directions based on target voltage information, and implement open-loop control of motor speeds in the three directions of pitch, roll and yaw by using the drive bridge;

an angular velocity loop control unit, configured to establish an angular velocity loop controller model based on the actuator control unit, where after parameter optimization using a particle swarm algorithm, the angular velocity loop controller model generates target voltage information according to a combination of actual angular velocity information obtained by the inertial measurement unit and target angular velocity information, and sends the target voltage information to the actuator control unit; and an angular displacement loop control unit, configured to establish an angular displacement loop controller model based on the optimized angular velocity loop controller model, where after parameter optimization using the particle swarm algorithm, the angular displacement loop controller model generates target angular velocity information according to target steering information set by a user and actual angular displacement information obtained by the inertial measurement unit, and sends the target angular velocity information to the angular velocity loop control unit, to implement double closed-loop control.

Optionally, the pitch arm (4) is provided with a thread, and the counterweight block (13) is provided with a threaded hole; the thread fits the threaded hole, to connect the pitch arm (4) and the counterweight block (13), and a position of the counterweight block (13) on the pitch arm (4) is adjustable.

Optionally, the inertial measurement unit includes: an accelerometer, configured to measure an angular displacement value of the camera;

a gyroscope, configured to measure an instantaneous angular velocity value of the camera; and a complementary calculation unit, configured to perform quaternion complementary calculation on the angular velocity value measured by the gyroscope and the angular displacement value measured by the accelerometer, to obtain a precise instantaneous angle value.

Optionally, the pitch motor, the roll motor, and the yaw motor are all brushless DC motors.

A control method of the vehicle-mounted camera gimbal servo system includes the following steps:

S1: measuring angular velocity information and angular displacement information of the camera (11) by using the inertial measurement unit mounted on the camera (11), and generating precise angular displacement information by using a quaternion complementary filtering algorithm;

S2: establishing Simulink models in three directions of pitch, roll and yaw according to a mechanical structure of the camera tri-axial gimbal in combination with parameters of the pitch motor, the roll motor, and the yaw motor; generating IGBT switching sequence information of the drive bridge according to the position sensors in the motors; generating an IGBT duty cycle of the drive bridge based on target voltage information, and implementing open-loop control of motor speeds in the three directions of pitch, roll and yaw by using the drive bridge, to obtain an actuator control model, that is, a Simulink control model of the pitch motor, the roll motor, and the yaw motor;

S3: establishing an angular velocity loop controller model in Simulink based on the actuator control model, and optimizing parameters of the angular velocity loop controller model iteratively by using a particle swarm optimization algorithm, where a parameter-optimized angular velocity loop controller generates the target voltage information according to a combination of the actual angular velocity information obtained by the inertial measurement unit and target angular velocity information; and S4: establishing an angular displacement loop controller model in Simulink based on the angular velocity loop controller model, and optimizing parameters of the angular displacement loop controller model by using a particle swarm optimization method, where the parameter-optimized angular displacement loop controller model generates the target angular velocity information according to target steering information set by a user and the actual angular displacement information obtained by the inertial measurement unit, and sends the target angular velocity information to the angular velocity loop controller model, thereby implementing double closed-loop control.

Optionally, step S1 specifically includes:

for the instantaneous angular velocity obtained by the gyroscope, obtaining quaternions of the instantaneous angular velocity by solving a quaternion update equation:

where the quaternion update equation is as follows:

$$\begin{pmatrix} \dot{q}_0 \\ \dot{q}_1 \\ \dot{q}_2 \\ \dot{q}_3 \end{pmatrix} = \frac{1}{2} \begin{pmatrix} 0 & -\omega_x & -\omega_y & -\omega_z \\ \omega_x & 0 & \omega_z & -\omega_y \\ \omega_y & -\omega_z & 0 & \omega_x \\ \omega_z & \omega_y & -\omega_x & 0 \end{pmatrix} \begin{pmatrix} q_0 \\ q_1 \\ q_2 \\ q_3 \end{pmatrix} \quad (1)$$

where $q_0$, $q_1$, $q_2$, and $q_3$ represent the quaternions of the instantaneous angular velocity; $\dot{q}_0$, $\dot{q}_1$, $\dot{q}_2$, and $\dot{q}_3$ are derivatives of the quaternions; $\omega_x$, $\omega_y$, and $\omega_z$ are an x-axis component, a y-axis component, and a z-axis component of the instantaneous angular velocity, respectively;

determining, according to the quaternions of the instantaneous angular velocity, a quaternion matrix for transformation from a measured-object coordinate system b to a ground coordinate system R:

$$C_b^R = \begin{pmatrix} T_{11} & T_{12} & T_{13} \\ T_{21} & T_{22} & T_{23} \\ T_{31} & T_{32} & T_{33} \end{pmatrix} = \begin{pmatrix} 1-2(q_2^2+q_3^2) & 2(q_1q_2-q_0q_3) & 2(q_1q_3+q_0q_2) \\ 2(q_1q_2+q_0q_3) & 1-2(q_1^2+q_3^2) & 2(q_2q_3-q_0q_1) \\ 2(q_1q_3-q_0q_2) & 2(q_2q_3+q_0q_1) & 1-2(q_1^2+q_2^2) \end{pmatrix} \quad (2)$$

where $C_b^R$ is the quaternion matrix; $T_{11}$, $T_{12}$, $T_{13}$, $T_{21}$, $T_{22}$, $T_{23}$, $T_{31}$, $T_{32}$, and $T_{33}$ are elements of the quaternion matrix;

determining, according to the quaternion matrix, an attitude angle as follows:

$$\begin{cases} \theta = \arcsin(T_{32}) \\ \gamma = \arctan\left(-\frac{T_{31}}{T_{33}}\right) \\ \psi = \arctan\left(\frac{T_{12}}{T_{22}}\right) \end{cases} \quad (3)$$

where $\theta$ is a pitch angle, $\gamma$ is a roll angle, and $\psi$ is a yaw angle; and processing, by using a low-pass filter, angle values obtained by the accelerometer; processing, by using a high-pass filter, the attitude angle calculated by the gyroscope; and calculating a weighted sum to obtain the precise angular displacement information;

$$\beta_p = \frac{dt}{dt+\tau} \times \beta_{p1} + \frac{\tau}{dt+\tau} \times \beta_{p2} \quad (4)$$

$$\beta_r = \frac{dt}{dt+\tau} \times \beta_{r1} + \frac{\tau}{dt+\tau} \times \beta_{r2} \quad (5)$$

where $\beta_p$ is a pitch angle in the angular displacement information, $\beta_{p1}$ is a pitch angle value obtained by the accelerometer, $\beta_{p2}=\theta$ is a pitch angle calculated by the gyroscope, $\beta_r$ is a roll angle in the precise angular displacement information, $\beta_{r1}$ is a roll angle value obtained by the accelerometer, $\beta_{r2}=\gamma$ is a roll angle calculated by the gyroscope, and $\tau$ is a time constant.

Optionally, step S2 specifically includes the following sub-steps:

S201: establishing a three-dimensional model of the camera tri-axial gimbal in SolidWorks, configuring a material of the three-dimensional model, and calculating rotational inertia of load on three rotation shafts;

S202: building the actuator control model in Simulink, configuring motor parameters including interphase inductance, line resistance, number of pole pairs, and viscosity coefficients of the rotation shafts, and the rotational inertia of the load;

S203: building an encoder module in Simulink, and calculating an IGBT bridge switching sequence based on information of the position sensors;

S204: building a PWM module and a constant voltage power supply module in Simulink;

S205: inputting a driving voltage signal, that is, the target voltage information u outputted by the angular velocity loop control unit, into the whole model, where the input satisfies the following condition:

$$\begin{cases} u > -U_{max} \\ u < U_{max} \end{cases} \quad (6)$$

to obtain the actuator control model, where $U_{max}$ is a maximum voltage limit.

Optionally, step S3 includes:

S301: establishing an angular velocity loop controller model in Simulink, and saving the angular velocity loop controller model in .mdl format; setting a step target angular velocity in the angular velocity loop controller model in .mdl format, using parameters $K'_p$ and $K_i$ of the angular velocity loop controller as a model input, and using a feedback angular velocity of the step target angular velocity of the angular velocity loop controller model as a model output;

S302: establishing a PSO main function in Matlab, setting the number of particle dimensions to 2, the number of particles to 50, and the maximum number of iterations to 100, where in the particle velocity update formula (7), i denotes the i-th particle, k denotes the number of iterations, d denotes the number of dimensions, and x denotes a particle position; pbest and gbest denote an individual historical optimal position and a global optimal position, respectively; $c_1$ and $c_2$ are an individual learning rate and a group learning rate, respectively; $r_1$ and $r_2$ are [0, 1], w is an inertia weight, and w decreases linearly from 0.9 to 0.4 to improve search efficiency and reduce a probability of falling into a local optimum;

$$v_{id}^k = w \times v_{id}^{k-1} + c_1 \times r_1 \times (pbest_{id} - x_{id}^{k-1}) + c_2 \times r_2 \times (gbest_d - x_{id}^{k-1}) \quad (7)$$

$$x_{id}^k = x_{id}^{k-1} + v_{id}^{k-1} \quad (8)$$

where $v_{id}^k$ and $v_{id}^{k-1}$ denote particle velocities of the i-th particle in the d-th dimension during the k-th iteration and the (k−1)-th iteration, respectively; $x_{id}^k$ and $x_{id}^{k-1}$ denote particle positions of the i-th particle in the d-th dimension during the k-th iteration and the (k−1)-th iteration, respectively; $pbest_{id}$ denotes an individual historical optimal position of the i-th particle in the d-th dimension during the (k−1)-th iteration, and $gbest_d$ denotes a global optimal position in the d-th dimension during the (k−1)-th iteration;

S303: defining a fitness function of the angular velocity loop controller as a weighted sum of an overshoot and an absolute error value of the angular velocity loop controller, where an inertia weight of an overshoot item is 0.009, and an inertia weight of an absolute error value item is 1:

$$y_{fit} = w_1 \times \delta + \int w_2 \times |e| \times dt \quad (9)$$

where $y_{fit}$ is a fitness function value of the angular velocity loop controller, $w_1$ is the weight of the overshoot item of the angular velocity loop controller, $w_2$ is the weight of the absolute error value item of the angular velocity loop controller, $\delta$ is the overshoot of the angular velocity loop controller, and e is an error of the angular velocity loop controller;

S304: calling the angular displacement loop controller model in .mdl format based on a sim( ) command in each iteration, to obtain a feedback steering angle of the step target angular velocity of the angular displacement loop controller model corresponding to each particle; calculating a fitness function value of each particle by using formula (9) according to the feedback steering angle of the step target angular velocity of the angular displacement loop controller model corresponding to each particle; updating a particle velocity by using formula (7), and updating a particle position by using formula (8), where the particle position and velocity need to satisfy constraint conditions defined by formula (10) and formula (11):

$$\begin{cases} x_{id}^k > -x_{max} \\ x_{id}^k < x_{max} \end{cases} \quad (10)$$

$$\begin{cases} v_{id}^k > -v_{max} \\ v_{id}^k < v_{max} \end{cases} \quad (11)$$

where $x_{max}$ is a maximum position limit, and $v_{max}$ is a maximum velocity limit; and performing iteration continuously till the maximum number of iterations, and obtaining a global optimal position at the maximum number of iterations as an optimal solution of $K'_p$ and $K_i$.

Optionally, step S4 specifically includes:

S401: establishing an extended state observer (ESO), where a basic process of a second-order ESO discrete system is as follows:

$$e_0 = z_1(k) - y(k) \quad (12)$$

$$z_1(k+1) = z_1(k) + ts \times (z_2(k) - \beta_{01} \times e_0) \quad (13)$$

$$z_2(k+1) = z_2(k) + ts \times (z_3(k) - \beta_{02} \times fal(e_0, 0.5, \delta_0) + b \times u) \quad (14)$$

$$z_3(k+1) = z_3(k) - ts \times \beta_{03} \times fal(e_0, 0.25, \delta_0) \quad (15)$$

$$fal(e_0, \alpha, \delta_0) = \begin{cases} |e_0|^\alpha \times sign(e_0), & |e_0| > \delta_0 \\ \dfrac{e_0}{\delta_0^{1-\alpha}}, & |e_0| \le \delta_0, \end{cases} \quad (\delta_0 > 0) \quad (16)$$

where $e_0$ is an output error; k denotes moment k; y(k) is an output of the whole system at moment k; $z_1(k)$, $z_2(k)$, and $z_3(k)$ are observed state vectors at moment k; $z_1(k+1)$, $z_2(k+1)$, and $z_3(k+1)$ are updated observed state vectors at moment k+1; is is a step size; $\beta_{01}$, $\beta_{02}$, and $\beta_{03}$ are a first error coefficient, a second error coefficient, and a third error coefficient of the ESO, respectively; $\alpha$ and $\delta_0$ are an exponential coefficient and a threshold coefficient of a fal function, respectively; b is a control volume coefficient; $\beta_{01}$, $\beta_{02}$, $\beta_{03}$, $\alpha$, and $\delta$ are coefficients determined empirically, and b is a parameter to be optimized and determined by an optimization method; fal(•) is the fal function; and u is a control volume outputted by the angular displacement loop controller;

S402: establishing a tracking differentiator (TD), where the discrete system TD established based on fhan is as follows:

$$fh = fhan(x_1(k) - v(k), x_2(k), r_0, h_0) \quad (17)$$

$$x_1(k+1) = x_1(k) + ts \times x_2(k) \quad (18)$$

$$x_2(k+1) = x_2(k) + ts \times fh \quad (19)$$

where v(k) is a control target at moment k; $x_1(k)$ and $x_2(k)$ are tracking control targets at moment k; $x_1(k+1)$ and $x_2(k+1)$ are updated tracking control targets at moment k+1; is is a step size; fhan(•) is a fhan function, and an expression of fhan is shown in formula (28):

the expression of fhan is shown as follows:

$$d = r_0 \times h_0^2 \quad (20)$$

$$a_0 = h_0 \times x_2(k) \quad (21)$$

$$y = x_1(k) - v(k) + a_0 \quad (22)$$

$$a_1 = \sqrt{d \times (d + 8 \times |y(k)|)} \quad (23)$$

$$a_2 = a_0 + sign(y(k)) \times \frac{(a_1 - d)}{2} \quad (24)$$

$$s_y = \frac{sign(y(k) + d) - sign(y(k) - d)}{2} \quad (25)$$

$$a = (a_0 + y(k) - a_2) \times s_y + a_2 \quad (26)$$

-continued $$s_a = \frac{\text{sign}(a+d) - \text{sign}(a-d)}{2} \quad (27)$$

$$fhan = -r_0 \times \left[\frac{a}{d} - \text{sign}(a)\right] \times s_a - r_0 \times \text{sign}(a) \quad (28)$$

where x is an inputted state vector; $r_0$ and $h_0$ are a first set parameter and a second set parameter of the fhan function; d, $a_0$, $a_1$, $a_2$, $s_y$, a, and $s_a$ are a first intermediate parameter, a second intermediate parameter, a third intermediate parameter, a fourth intermediate parameter, a fifth intermediate parameter, a sixth intermediate parameter, and a seventh intermediate parameter of the fhan function, respectively; $r_0$ and $h_0$ are coefficients determined empirically;

S403: establishing a nonlinear state error feedback (NLSEF) controller, where a discrete process of the nonlinear state error feedback controller is as follows:

$$u_0 = K_p \times fal(e_1, a_1, \delta_0) + K_d \times fal(e_2, a_2, \delta_0) \quad (29)$$

$$u = u_0 - \frac{z_3(k+1)}{b_0} \quad (30)$$

where $u_0$ is an intermediate parameter of the angular displacement loop controller; u is a control volume outputted by the angular displacement loop controller; $e_1$ and $e_2$ are two observed state vector errors, where $e_1 = x_1(k+1) - z_1(k+1)$ and $e_2 = x_2(k+1) - z_2(k+1)$; $a_1$ and $a_2$ are two specific values of the exponential coefficient α of the fal function; $a_1$, $a_2$, δ, and $b_0$ are coefficients determined empirically; $K_p$ and $K_d$ are a proportion coefficient and a differential coefficient, respectively, and need to be optimized;

S404: saving, in .mdl format, a Simulink model of the angular displacement loop controller established through steps 401 to 403, to obtain an angular displacement loop controller model in .mdl format, where an input of the angular displacement loop controller model in .mdl format is three optimization parameters $K_p$, $K_d$, and b, and an output of the model is a feedback angular displacement of the step target angular displacement;

S405: establishing a PSO main function in Matlab, setting the number of particle dimensions to 2, the number of particles to 50, and the maximum number of iterations to 100, where an inertia weight of a particle velocity update formula decreases linearly from 0.9 to 0.4 to improve search efficiency and reduce a probability of falling into a local optimum;

S406: defining a fitness function of the angular displacement loop controller as a weighted sum of an overshoot of the angular displacement loop controller and an absolute error value of the angular displacement loop controller, where an inertia weight of an overshoot item is 0.009, and an inertia weight of an absolute error value item is 1:

$$y'_{fit} = w'_1 \times \delta' + \int w'_2 \times |e'| \times dt \quad (31)$$

where $y'_{fit}$ is a fitness function value of the angular displacement loop controller, $w'_1$ is the weight of the overshoot item of the angular velocity loop controller, $w'_2$ is the weight of the absolute error value item of the angular velocity loop controller, δ' is the overshoot of the angular velocity loop controller, and e' is an error of the angular velocity loop controller;

S407: calling the Simulink model based on a sim( ) command in each iteration, to calculate a fitness function value, update a particle velocity, and update a particle position; and performing iteration continuously till the maximum number of iterations, to obtain optimal solutions of $K_p$, $K_d$, and b.

The present disclosure has the following beneficial effects: the present disclosure constructs a double closed-loop control framework with an angular displacement loop as an outer loop and an angular velocity loop as an inner loop. Based on nonlinear state error feedback (NLSEF), control volumes are combined nonlinearly to improve the dynamic performance of the servo system; based on an extended state observer (ESO), system disturbance is observed in real time and compensated, thereby improving the anti-disturbance capability of the servo system. Parameters of an angular displacement loop controller are adjusted based on a method of combining experience with optimization, and a weighted sum of an overshoot δ and an error absolute value |e| is used as a fitness function of particle swarm optimization. The method reduces the complexity of parameter adjustment of the angular displacement loop controller and ensures that the servo system achieves a corresponding control effect.

BRIEF DESCRIPTION OF THE DRAWINGS

To describe the technical solutions in the embodiments of the present disclosure or in the prior art more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

In the drawings, 1-roll arm, 2-pitch motor stator, 3-pitch motor rotor, 4-pitch arm, 5-yaw arm, 6-yaw motor stator, 7-gimbal top, 8-yaw motor rotor, 9-roll motor stator, 10-roll motor rotor, 11-camera, 12-pitch-axis bearing, and 13-counterweight block.

DETAILED DESCRIPTION

The technical solutions of the embodiments of the present disclosure are clearly and completely described below with reference to the accompanying drawings. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to overcome the deficiencies of the prior art and provide a vehicle-mounted camera gimbal servo system and a control method, to improve dynamic performance and anti-disturbance performance of real-time control of the camera tri-axial gimbal servo system and guarantee the safety of a driverless vehicle.

To make the objectives, features, and advantages of the present disclosure more obvious and comprehensive, the following further describes in detail the present disclosure with reference to the accompanying drawings and specific implementations.

Figure 1:
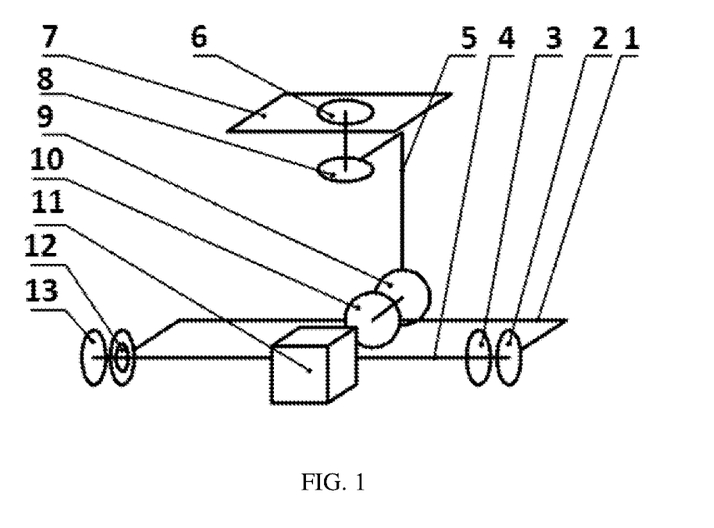
FIG. 1 is a schematic structural diagram of a camera tri-axial gimbal.
Figure 2:
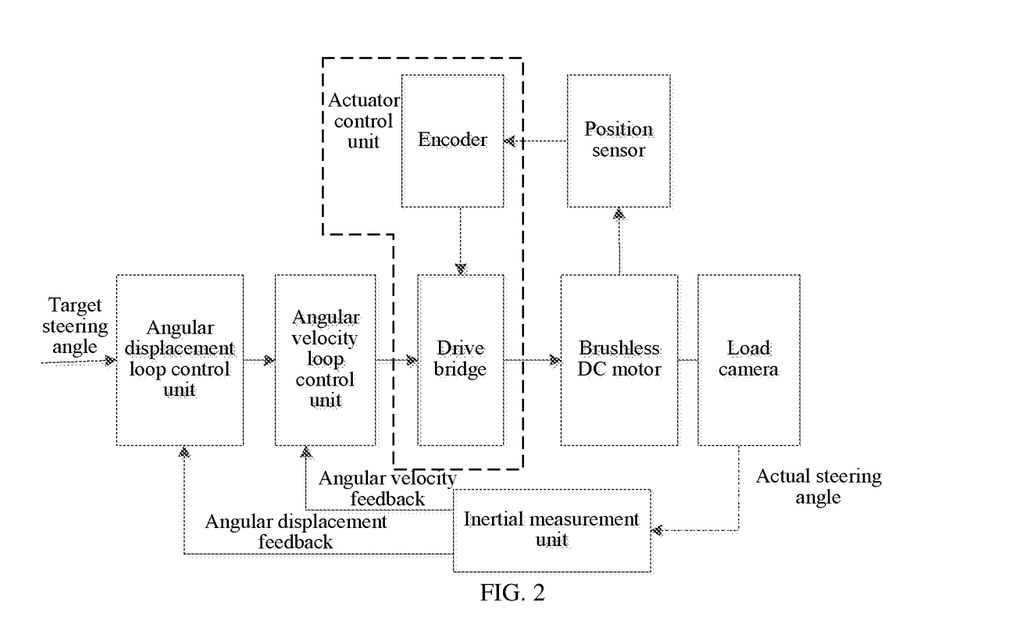
FIG. 2 is a schematic diagram showing the principle of a servo control apparatus.

As shown in FIG. 1 and FIG. 2, a vehicle-mounted camera gimbal servo system includes a camera tri-axial gimbal and a servo control apparatus.

The camera tri-axial gimbal includes a pitch motor, a roll motor, a yaw motor, a roll arm 1, a pitch arm 4, a yaw arm 5, a gimbal top 7, a camera 11, a pitch-axis bearing 12, and a counterweight block 13; the pitch motor includes a pitch motor stator 2 and a pitch motor rotor 3; the yaw motor includes a yaw motor stator 6 and a yaw motor rotor 8; the roll motor includes a roll motor stator 9 and a roll motor rotor 10.

The camera 11 is fixedly connected to the pitch motor rotor 3 through the pitch arm 4, and the pitch motor rotor 3 is used for implementing movement in a pitch direction; the counterweight block 13 is connected on the pitch arm 4 in a threaded manner, to compensate for a gravitational unbalance moment in a roll direction caused by the self-weight of the pitch motor; the pitch arm 4 is constrained by the pitch-axis bearing 12; the pitch motor stator 2 is fixedly connected to the roll motor rotor 10 through the roll arm 1, and the roll motor rotor 10 is used for implementing movement in the roll direction; the roll motor stator 9 is fixedly connected to the yaw motor rotor 8 through the yaw arm 5; the yaw motor rotor 8 is used for implementing movement in a yaw direction; the yaw motor stator 6 is fixedly connected to the gimbal top 7, and the gimbal top 7 is fixed near a rear view mirror on an inner top portion of a vehicle, so that the whole camera tri-axial gimbal is fixedly connected near the rear view mirror on the inner top portion of the vehicle; position sensors are disposed inside the pitch motor, the roll motor and the yaw motor.

The servo control apparatus includes:
an inertial measurement unit, mounted on the camera 11, configured to measure angular velocity information and angular displacement information of the camera 11, and generate precise angular displacement information by using a quaternion complementary filtering algorithm;

an actuator control unit, configured to generate IGBT switching sequence information of adrive bridge in three directions according to the position sensors in the pitch motor, the yaw motor, and the roll motor; and generate an IGBT duty cycle of the drive bridge based on target voltage information in the three directions, and implement open-loop control of motor speeds in the three directions of pitch, roll and yaw by using the drive bridge;

an angular velocity loop control unit, configured to establish an angular velocity loop controller model based on the actuator control unit, where after parameter optimization using a particle swarm algorithm, the angular velocity loop controller model generates duty cycle information of a motor driving voltage PWM signal according to a combination of the actual angular velocity information obtained by the inertial measurement unit and target angular velocity information, and transmits the duty cycle information to the drive bridge of the actuator control unit; and an angular displacement loop control unit, configured to establish an angular displacement loop controller model based on the optimized angular velocity loop controller model, where after parameter optimization using the particle swarm algorithm, the angular displacement loop controller model generates a target angular velocity according to target steering information set by a user and the actual angular displacement information obtained by the inertial measurement unit, and sends the target angular velocity to the angular velocity loop controller model, to implement double closed-loop control.

In the embodiment of the present disclosure, the actuator control unit mainly includes an encoder and a drive bridge. The encoder is configured to generate the IGBT switching sequence information of the drive bridge in the three directions according to the position sensors in the pitch motor, the yaw motor, and the roll motor, and generate the IGBT duty cycle of the drive bridge based on the target voltage information in the three directions; the drive bridge is configured to implement open-loop control of motor speeds in the three directions of pitch, roll and yaw.

In the embodiment of the present disclosure, the pitch arm 4 is provided with a thread, and the counterweight block 13 is provided with a threaded hole. The thread fits the threaded hole, to connect the pitch arm 4 and the counterweight block 13, and a position of the counterweight block 13 on the pitch arm 4 is adjustable. The inertial measurement unit includes: an accelerometer, configured to measure an angular displacement value of the camera; a gyroscope, configured to measure an instantaneous angular velocity value of the camera; a complementary calculation unit, configured to perform quaternion complementary calculation on the angular velocity value measured by the gyroscope and the angular displacement value measured by the accelerometer, to obtain a precise instantaneous angle value. The pitch motor, the roll motor, and the yaw motor are all brushless DC motors. The three directions of pitch, roll and yaw are defined as follows: a pitch axis is located in a horizontal plane, and is perpendicular to a forward direction of the vehicle; a roll axis is located in the horizontal plane, and points to the forward direction of the vehicle; and a yaw axis is perpendicular to a horizontal plane of a geodetic coordinate system and points upward. The structures are connected in the following manner: the pitch motor stator 2, the roll motor stator 9, and the yaw motor stator 6 are each fixedly connected to a fixed connection structure by using 4 screws. The pitch motor rotor 3, the roll motor rotor 10, and the yaw motor rotor 8 are each fixedly connected to a fixed connection structure by using 4 screws. The gimbal top 7 is fixedly connected to the inner top portion of the vehicle by using 4 screws. Harnesses of the motors are led out in the following manner: the harness of the pitch motor is led out through a hole on the roll arm 1, the harness of the roll motor is led out through a hole on the yaw arm 5, and the harness of the yaw motor is led out through a hole on the gimbal top 7.

The present disclosure further provides a control method of the vehicle-mounted camera gimbal servo system.

Figure 3:
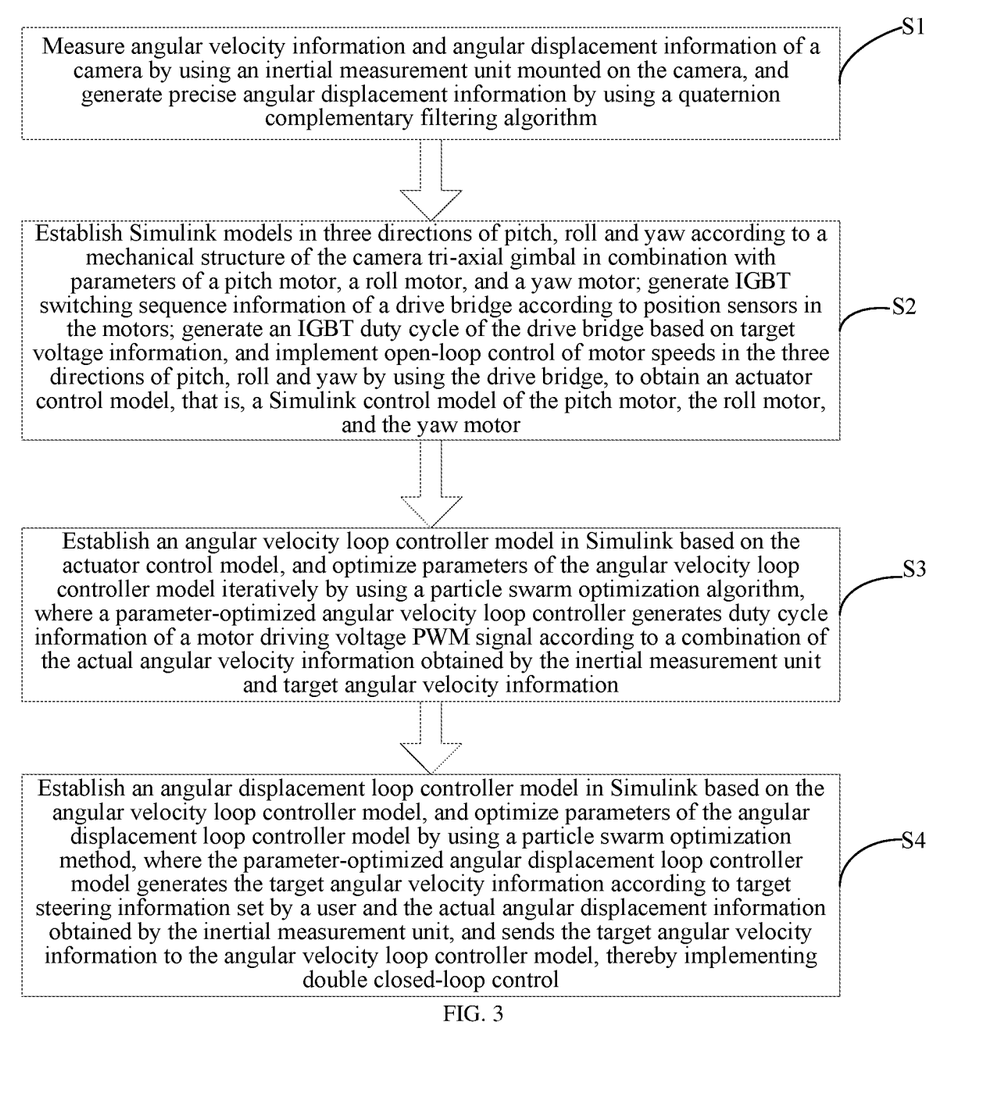
FIG. 3 is a flowchart of an implementation of a control method of a vehicle-mounted camera gimbal servo system according to the present disclosure.

As a specific implementation, as shown in FIG. 3, the control method of the vehicle-mounted camera gimbal servo system includes the following steps:

S1: measure angular velocity information and angular displacement information of the camera 11 by using the inertial measurement unit mounted on the camera 11, and generate precise angular displacement information by using a quaternion complementary filtering algorithm.

S2. establish Simulink models in three directions of pitch, roll and yaw according to a mechanical structure of the camera tri-axial gimbal in combination with parameters of the pitch motor, the roll motor, and the yaw motor; generate IGBT switching sequence information of the drive bridge according to the position sensors in the motors; generate an IGBT duty cycle of the drive bridge based on target voltage information, and implement open-loop control of motor speeds in the three directions of pitch, roll and yaw by using the drive bridge, to obtain an actuator control model, that is, a Simulink control model of the pitch motor, the roll motor, and the yaw motor.

S3: establish an angular velocity loop controller model in Simulink based on the actuator control model, and optimize parameters of the angular velocity loop controller model iteratively by using a particle swarm optimization algorithm, where a parameter-optimized angular velocity loop controller generates the target voltage information according to a combination of the actual angular velocity information obtained by the inertial measurement unit and target angular velocity information.

S4: establish an angular displacement loop controller model in Simulink based on the angular velocity loop controller model, and optimize parameters of the angular displacement loop controller model by using a particle swarm optimization method, where the parameter-optimized angular displacement loop controller model generates the target angular velocity information according to target steering information set by a user and the actual angular displacement information obtained by the inertial measurement unit, and sends the target angular velocity information to the angular velocity loop controller model, thereby implementing double closed-loop control.

Step S1 specifically includes the following process:

for an instantaneous angular velocity obtained by the gyroscope, obtaining quaternions of the instantaneous angular velocity by solving a quaternion update equation:

where the quaternion update equation is as follows:

$$\begin{pmatrix} \dot{q}_0 \\ \dot{q}_1 \\ \dot{q}_2 \\ \dot{q}_3 \end{pmatrix} = \frac{1}{2} \begin{pmatrix} 0 & -\omega_x & -\omega_y & -\omega_z \\ \omega_x & 0 & \omega_z & -\omega_y \\ \omega_y & -\omega_z & 0 & \omega_x \\ \omega_z & \omega_y & -\omega_x & 0 \end{pmatrix} \begin{pmatrix} q_0 \\ q_1 \\ q_2 \\ q_3 \end{pmatrix} \quad (1)$$

where $q_0$, $q_1$, $q_2$, and $q_3$ represent the quaternions of the instantaneous angular velocity; $\dot{q}_0$, $\dot{q}_1$, $\dot{q}_2$, and $\dot{q}_3$ are derivatives of the quaternions; $\omega_x$, $\omega_y$, and $\omega_z$ are an x-axis component, a y-axis component, and a z-axis component of the instantaneous angular velocity, respectively;

determining, according to the quaternions of the instantaneous angular velocity, a quaternion matrix for transformation from a measured-object coordinate system b to a ground coordinate system R:

$$C_b^R = \begin{pmatrix} T_{11} & T_{12} & T_{13} \\ T_{21} & T_{22} & T_{23} \\ T_{31} & T_{32} & T_{33} \end{pmatrix} = \begin{pmatrix} 1-2(q_2^2+q_3^2) & 2(q_1q_2-q_0q_3) & 2(q_1q_3+q_0q_2) \\ 2(q_1q_2+q_0q_3) & 1-2(q_1^2+q_3^2) & 2(q_2q_3-q_0q_1) \\ 2(q_1q_3-q_0q_2) & 2(q_2q_3+q_0q_1) & 1-2(q_1^2+q_2^2) \end{pmatrix} \quad (2)$$

where $C_b^R$ is the quaternion matrix; $T_{11}$, $T_{12}$, $T_{13}$, $T_{21}$, $T_{22}$, $T_{23}$, $T_{31}$, $T_{32}$ and $T_{33}$ are elements of the quaternion matrix;

determining, according to the quaternion matrix, an attitude angle as follows:

$$\begin{cases} \theta = \arcsin(T_{32}) \\ \gamma = \arctan\left(-\frac{T_{31}}{T_{33}}\right) \\ \psi = \arctan\left(\frac{T_{12}}{T_{22}}\right) \end{cases} \quad (3)$$

where $\theta$ is a pitch angle, $\gamma$ is a roll angle, and $\psi$ is a yaw angle; and processing, by using a low-pass filter, angle values obtained by the accelerometer; processing, by using a high-pass filter, the attitude angle calculated by the gyroscope; and calculating a weighted sum to obtain the precise angular displacement information;

$$\beta_p = \frac{dt}{dt+\tau} \times \beta_{p1} + \frac{\tau}{dt+\tau} \times \beta_{p2} \quad (4)$$

$$\beta_r = \frac{dt}{dt+\tau} \times \beta_{r1} + \frac{\tau}{dt+\tau} \times \beta_{r2} \quad (5)$$

where $\beta_p$ is a pitch angle in the angular displacement information, $\beta_{p1}$ is a pitch angle value obtained by the accelerometer, $\beta_{p2}=\theta$ is a pitch angle calculated by the gyroscope, $\beta_r$ is a roll angle in the precise angular displacement information, $\beta_{r1}$ is a roll angle value obtained by the accelerometer, $\beta_{r2}=\gamma$ is a roll angle calculated by the gyroscope, and $\tau$ is a time constant.

Step S2 includes the following sub-steps:

S201: establish a three-dimensional model of the camera tri-axial gimbal in SolidWorks, configure a material of the three-dimensional model, and calculate rotational inertia of load on three rotation shafts.

S202: build the actuator control model in Simulink, configure motor parameters including interphase inductance, line resistance, number of pole pairs, and viscosity coefficients of the rotation shafts, and the rotational inertia of the load.

S203: build an encoder module in Simulink, and calculate an IGBT bridge switching sequence based on information of the position sensors.

S204: build a PWM module and a constant voltage power supply module in Simulink.

S205: input a driving voltage signal, that is, the target voltage information u outputted by the angular velocity loop control unit, into the whole model, where the input satisfies the following condition:

$$\begin{cases} u > -U_{max} \\ u < U_{max} \end{cases} \quad (6)$$

In this way, the actuator control model is obtained, where is a maximum voltage limit.

Step S3 includes the following process:

S301: establish an angular velocity loop controller model in Simulink, and save the angular velocity loop controller model in .mdl format; set a step target angular velocity in the angular velocity loop controller model in .mdl format, use parameters $K'_{op}$ and Ki of the angular velocity loop controller as a model input, and use a feedback angular velocity of the step target angular velocity of the angular velocity loop controller model as a model output.

S302: establish a PSO main function in Matlab, set the number of particle dimensions to 2, the number of particles to 50, and the maximum number of iterations to 100, where in the particle velocity update formula (7), i denotes the i-th particle, k denotes the number of iterations, d denotes the number of dimensions, and x denotes a particle position; pbest and gbest denote an individual historical optimal position and a global optimal position, respectively; $c_1$ and $c_2$ are an individual learning rate and a group learning rate, respectively; $r_1$ and $r_2$ are [0, 1], w is an inertia weight, and w decreases linearly from 0.9 to 0.4 to improve search efficiency and reduce a probability of falling into a local optimum.

$$v_{id}^k = w \times v_{id}^{k-1} + c_1 \times r_1 \times (pbest_{id} - x_{id}^{k-1}) + c_2 \times r_2 \times (gbest_d - x_{id}^{k-1}) \tag{7}$$

$$x_{id}^k = x_{id}^{k-1} + v_{id}^{k-1} \tag{8}$$

where $v_{id}^k$ and $v_{id}^{k-1}$ denote particle velocities of the i-th particle in the d-th dimension during the k-th iteration and the (k−1)-th iteration, respectively; $x_{id}^k$ and $x_{id}^{k-1}$ denote particle positions of the i-th particle in the d-th dimension during the k-th iteration and the (k−1)-th iteration, respectively; $pbest_{id}$ denotes an individual historical optimal position of the i-th particle in the d-th dimension during the (k−1)-th iteration, and $gbest_d$ denotes a global optimal position in the d-th dimension during the (k−1)-th iteration.

S303: define a fitness function of the angular velocity loop controller as a weighted sum of an overshoot and an absolute error value of the angular velocity loop controller, where an inertia weight of an overshoot item is 0.009, and an inertia weight of an absolute error value item is 1:

$$y_{fit} = w_1 \times \delta + \int w_2 \times |e| \times dt \tag{9}$$

where $y_{fit}$ is a fitness function value of the angular velocity loop controller, $w_1$ is the weight of the overshoot item of the angular velocity loop controller, $w_2$ is the weight of the absolute error value item of the angular velocity loop controller, δ is the overshoot of the angular velocity loop controller, and e is an error of the angular velocity loop controller.

S304: call the angular displacement loop controller model in .mdl format based on a sim( ) command in each iteration, to obtain a feedback steering angle of the step target angular velocity of the angular displacement loop controller model corresponding to each particle; calculate a fitness function value of each particle by using formula (9) according to the feedback steering angle of the step target angular velocity of the angular displacement loop controller model corresponding to each particle; update a particle velocity by using formula (7), and update a particle position by using formula (8), where the particle position and velocity need to satisfy constraint conditions defined by formula (10) and formula (11):

$$\begin{cases} x_{id}^k > -x_{max} \\ x_{id}^k < x_{max} \end{cases} \tag{10}$$

$$\begin{cases} v_{id}^k > -v_{max} \\ v_{id}^k < v_{max} \end{cases} \tag{11}$$

where $x_{max}$ is a maximum position limit, and $v_{max}$ is a maximum velocity limit; and perform iteration continuously till the maximum number of iterations, and obtain a global optimal position at the maximum number of iterations as an optimal solution of $K'_p$ and $K_i$.

Figure 4:
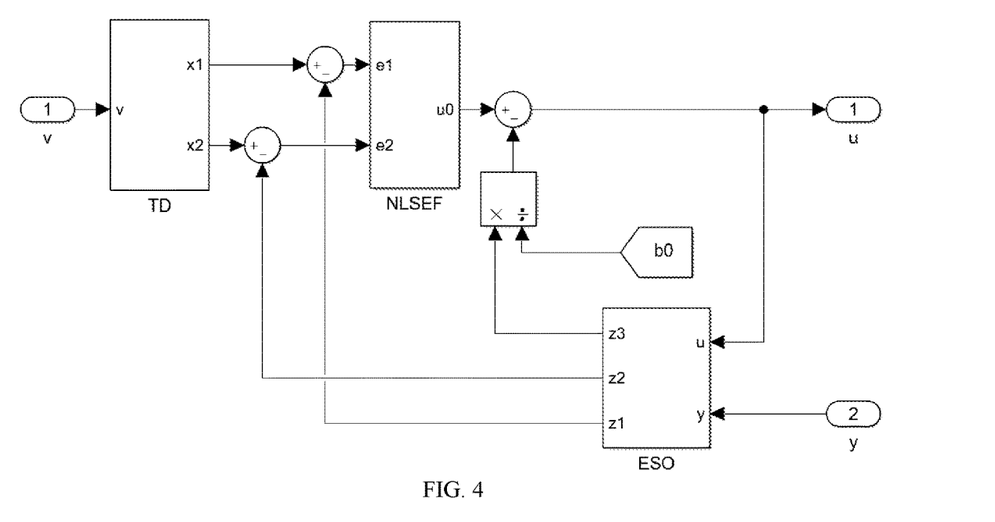
FIG. 4 is a structural diagram of an angular displacement loop controller according to the present disclosure.

As shown in FIG. 4, the angular displacement loop controller of the present disclosure includes: an extended state observer (ESO), a tracking differentiator (TD), and a nonlinear state error feedback (NLSEF) controller. Step S4 includes the following processes:

S401: establish an extended state observer (ESO), where a basic process of a second-order ESO discrete system is as follows:

$$e_0 = z_1(k) - y(k) \tag{12}$$

$$z_1(k+1) = z_1(k) + ts \times (z_2(k) - \beta_{01} \times e_0) \tag{13}$$

$$z_2(k+1) = z_2(k) + ts \times (z_3(k) - \beta_{02} \times fal(e_0, 0.5, \delta_0) + b \times u) \tag{14}$$

$$z_3(k+1) = z_3(k) - ts \times \beta_0 \times fal(e_0, 0.25, \delta_0) \tag{15}$$

$$fal(e_0, \alpha, \delta_0) = \begin{cases} |e_0|^\alpha \times sign(e_0), & |e_0| > \delta_0 \\ \dfrac{e_0}{\delta_0^{1-\alpha}}, & |e_0| \le \delta_0, \end{cases} \quad (\delta_0 > 0) \tag{16}$$

where $e_0$ is an output error; k denotes moment k; y(k) is an output of the whole system at moment k; $z_1(k)$, $z_2(k)$, and $z_3(k)$ are observed state vectors at moment k; $z_1(k+1)$, $z_2(k+1)$, and $z_3(k+1)$ are updated observed state vectors at moment k+1; ts is a step size; $\beta_{01}$, $\beta_{02}$, $\beta_{02}$, α and δ are coefficients determined empirically, α is 0.5, and b is a parameter to be optimized; fal(•) is a fal function; u is a control volume outputted by the angular displacement loop controller.

S402: establish a tracking differentiator (TD), where the discrete system TD established based on fhan is as follows:

$$fh = fhan(x_1(k) - v(k), x_2(k), r_0, h_0) \tag{17}$$

$$x_1(k+1) = x_1(k) + ts \times x_2(k) \tag{18}$$

$$x_2(k+1) = x_2(k) + ts \times fh \tag{19}$$

where v(k) is a control target at moment k; $x_1(k)$ and $x_2(k)$ are tracking control targets at moment k; $x_1(k+1)$ and $x_2(k+1)$ are updated tracking control targets at moment k+1; is is a step size; fhan(•) is a fhan function, and an expression of fhan is shown in formula (28):

The expression of fhan is shown as follows:

$$d = r_0 \times h_0^2 \tag{20}$$

$$a_0 = h_0 \times x_2 \tag{21}$$

$$y = x_1(k) - v(k) + a_0 \tag{22}$$

$$a_1 = \sqrt{d \times (d + 8 \times |y(k)|)} \tag{23}$$

$$a_2 = a_0 + sign(y(k)) \times \frac{(a_1 - d)}{2} \tag{24}$$

$$s_y = \frac{sign(y(k) + d) - sign(y(k) - d)}{2} \tag{25}$$

$$a = (a_0 + y(k) - a_2) \times s_y + a_2 \tag{26}$$

$$s_a = \frac{sign(a + d) - sign(a - d)}{2} \tag{27}$$

$$fhan = -r_0 \times \left[\frac{a}{d} - sign(a)\right] \times s_a - r_0 \times sign(a) \tag{28}$$

where x is an inputted state vector; $r_0$ and $h_0$ are coefficients determined empirically.

S403: establish a nonlinear state error feedback (NLSEF) controller, where a discrete process of the nonlinear state error feedback controller is as follows:

$$u_0 = K_p \times fal(e_1, \alpha_1, \delta_0) + K_d \times fal(e_2, \alpha_2, \delta_0) \quad (29)$$

$$u = u_0 - \frac{z_3(k+1)}{b_0} \quad (30)$$

where u is a control volume outputted by the angular displacement loop controller; $e_1$ and $e_2$ are observed state vector errors; $e_1 = x_1(k+1) - z_1(k+1)$, $e_2 = x_2(k+1) - z_2(k+1)$, $a_1$, $a_2$, $\delta$, and $b_0$ are coefficients determined empirically; $K_p$ and $K_d$ are a proportion coefficient and a differential coefficient, respectively, and need to be optimized.

S404: save, in .mdl format, a Simulink model of the angular displacement loop controller established through steps 401 to 403, to obtain an angular displacement loop controller model in .mdl format, where an input of the angular displacement loop controller model in .mdl format is three optimization parameters: $K_p$, $K_d$, and b, and an output of the model is a feedback angular displacement of the step target angular displacement.

S405: establish a PSO main function in Matlab, set the number of particle dimensions to 2, the number of particles to 50, and the maximum number of iterations to 100, where an inertia weight of a particle velocity update formula decreases linearly from 0.9 to 0.4 to improve search efficiency and reduce a probability of falling into a local optimum.

S406: define a fitness function of the angular displacement loop controller as a weighted sum of an overshoot of the angular displacement loop controller and an absolute error value of the angular displacement loop controller, where an inertia weight of an overshoot item is 0.009, and an inertia weight of an absolute error value item is 1:

$$y'_{fit} = w'_1 \times \delta' + \int w'_2 \times |e'| \times dt \quad (31)$$

where $y'_{fit}$ is a fitness function value of the angular displacement loop controller, $w'_1$ is the weight of the overshoot item of the angular velocity loop controller, $w'_2$ is the weight of the absolute error value item of the angular velocity loop controller, $\delta$ is the overshoot of the angular velocity loop controller, and e' is an error of the angular velocity loop controller.

S407: call the Simulink model based on a sim( ) command in each iteration, to calculate a fitness function value, update a particle velocity, and update a particle position; and perform iteration continuously till the maximum number of iterations, to obtain optimal solutions of $K_p$, $K_d$, and b.

Figure 5:
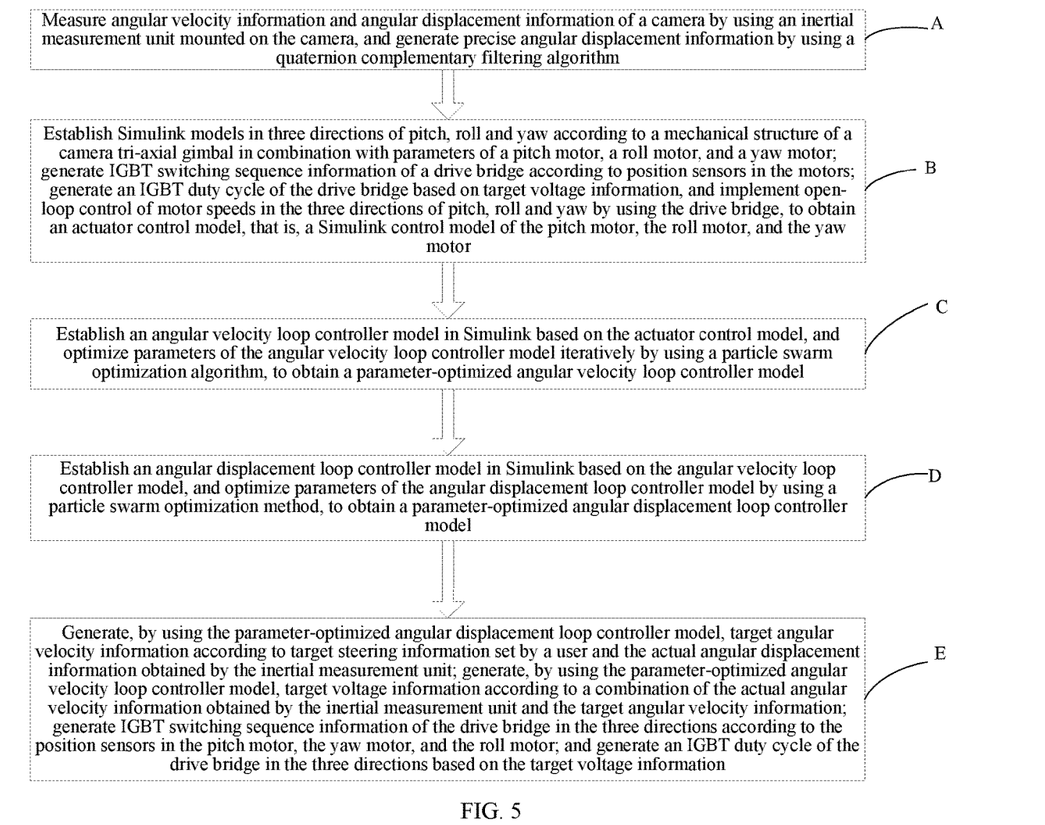
FIG. 5 is a flowchart of another implementation of a control method of a vehicle-mounted camera gimbal servo system according to the present disclosure.

During implementation of the present disclosure, an angular velocity loop control model and an angular displacement loop control model are first established and trained, and the models obtained after training are used for control. Specifically, as another specific implementation, as shown in FIG. 5, a control method of the vehicle-mounted camera gimbal servo system includes the following steps:

A: measure angular velocity information and angular displacement information of the camera 11 by using the inertial measurement unit mounted on the camera 11, and generate precise angular displacement information by using a quaternion complementary filtering algorithm.

B: establish Simulink models in three directions of pitch, roll and yaw according to a mechanical structure of the camera tri-axial gimbal in combination with parameters of the pitch motor, the roll motor, and the yaw motor; generate IGBT switching sequence information of the drive bridge according to the position sensors in the motors; generate an IGBT duty cycle of the drive bridge based on target voltage information, and implement open-loop control of motor speeds in the three directions of pitch, roll and yaw by using the drive bridge, to obtain an actuator control model, that is, a Simulink control model of the pitch motor, the roll motor, and the yaw motor.

C: establish an angular velocity loop controller model in Simulink based on the actuator control model, and optimize parameters of the angular velocity loop controller model iteratively by using a particle swarm optimization algorithm, to obtain a parameter-optimized angular velocity loop controller model.

D: establish an angular displacement loop controller model in Simulink based on the angular velocity loop controller model, and optimize parameters of the angular displacement loop controller model by using a particle swarm optimization method, to obtain a parameter-optimized angular displacement loop controller model.

E: generate, by using the parameter-optimized angular displacement loop controller model, target angular velocity information according to target steering information set by a user and the actual angular displacement information obtained by the inertial measurement unit;

generate, by using the parameter-optimized angular velocity loop controller model, target voltage information according to a combination of the actual angular velocity information obtained by the inertial measurement unit and the target angular velocity information; generate IGBT switching sequence information of the drive bridge in the three directions according to the position sensors in the pitch motor, the yaw motor, and the roll motor; and generate an IGBT duty cycle of the drive bridge in the three directions based on the target voltage information.

The present disclosure constructs a double closed-loop control framework with an angular displacement loop as an outer loop and an angular velocity loop as an inner loop. Based on nonlinear state error feedback (NLSEF), control volumes are combined nonlinearly to improve the dynamic performance of the servo system; based on an extended state observer (ESO), system disturbance is observed in real time and compensated, thereby improving the anti-disturbance capability of the servo system. Parameters of an angular displacement loop controller are adjusted based on a method of combining experience with optimization, and a weighted sum of an overshoot $\delta$ and an error absolute value $|e|$ is used as a fitness function of particle swarm optimization. The method reduces the complexity of parameter adjustment of the angular displacement loop controller and ensures that the servo system achieves a corresponding control effect.

The embodiments of the present disclosure are described above with reference to the accompanying drawings, but the present disclosure is not limited to the foregoing specific implementations. The foregoing specific implementations are merely illustrative rather than restrictive. Under the teaching of the present disclosure, those of ordinary skill in the art may make many variations without departing from the spirit of the present disclosure and the protection scope of the claims, and all such variations fall within the scope of the present disclosure.

What is claimed is:

1. A vehicle-mounted camera gimbal servo system, comprising a camera tri-axial gimbal and a servo control apparatus, wherein the camera tri-axial gimbal comprises:

(a) a pitch motor comprising a pitch motor stator (2), a pitch motor rotor (3), and one or more pitch position sensors disposed inside the pitch motor;

(b) a yaw motor comprising a yaw motor stator (6), a yaw motor rotor (8), and one or more yaw position sensors disposed inside the yaw motor;
(c) a roll motor comprising a roll motor stator (9), a roll motor rotor (10), and one or more roll position sensors disposed inside the roll motor;
(d) a roll arm (1);
(e) a pitch arm (4);
(f) a yaw arm (5);
(g) a camera (11) fixedly connected to the pitch motor rotor (3) through the pitch arm (4), and the pitch motor rotor (3) configured to cause movement of the camera (11) in a pitch direction;
(h) a counterweight block (13) connected to the pitch arm (4) in a threaded manner, the counterweight block (13) configured to compensate for a gravitational unbalance moment in a roll direction caused by a self-weight of the pitch motor;
(i) a pitch-axis bearing (12) configured to constrain the pitch arm (4);
(j) a gimbal top (7) fixed at a fixing position on a first side of an inner rear-view mirror mounted on an inner top portion of a vehicle, wherein all components of the camera tri-axial gimbal are fixedly connected to the inner top portion of the vehicle via the inner rear-view mirror;
wherein the pitch motor stator (2) is fixedly connected to the roll motor rotor (10) through the roll arm (1), the roll motor rotor (10) configured to cause movement of the camera (11) in the roll direction;
wherein the roll motor stator (9) is fixedly connected to the yaw motor rotor (8) through the yaw arm (5), the yaw motor rotor (8) configured to cause movement of the camera (11) in a yaw direction;
wherein the yaw motor stator (6) is fixedly connected to the gimbal top (7); and
the servo control apparatus comprises:
(k) an inertial measurement unit, mounted on the camera (11), the inertial measurement unit configured to measure angular velocity information and angular displacement information of the camera (11), and the inertial measurement unit comprising quaternion complementary filtering algorithm configured to generate precise angular velocity information based on the angular velocity information of the camera (11) and precise angular displacement information based on the angular velocity information of the camera (11);
(l) an actuator control unit comprising a drive bridge, the actuator control unit configured to generate insulated-gate bipolar transistor (IGBT) switching sequence information and an IGBT duty cycle of the drive bridge in three directions according to the one or more pitch position sensors in the pitch motor, the one or more yaw position sensors in the yaw motor, the one or more roll position sensors in the roll motor, and target voltage information, and the actuator control unit further configured to implement open-loop control in the three directions by using the drive bridge to selectively control speeds of each of the pitch motor, the yaw motor, and the roll motor;
(m) an angular velocity loop control unit comprising a first particle swarm algorithm configured to perform a first parameter optimization and an angular velocity loop controller model, the angular velocity loop control unit configured to establish the angular velocity loop controller model after the first parameter optimization and to obtain the target voltage information according to a combination of the angular velocity information obtained by the inertial measurement unit and target angular velocity information, and the angular velocity loop control unit further configured to sends the target voltage information to the actuator control unit; and
(n) an angular displacement loop control unit comprising a second particle swarm algorithm configured to perform a second parameter optimization and an angular displacement loop controller model, the angular displacement loop control unit configured to establish the angular displacement loop controller model after the second parameter optimization and to obtain the target angular velocity information according to target steering information set by a user and the angular displacement information obtained by the inertial measurement unit, and the angular displacement loop control unit further configured to send the target angular velocity information to the angular velocity loop control unit to implement double closed-loop control.

2. The vehicle-mounted camera gimbal servo system according to claim 1, wherein the counterweight block (13) connected to the pitch arm (4) in the threaded manner comprises the pitch arm (4) having a thread, the counterweight block (13) having a threaded hole, and the thread configured to fit into the threaded hole to connect the pitch arm (4) and the counterweight block (13), wherein a relative position of the counterweight block (13) to the pitch arm (4) is adjustable via changing a relative length of the thread through the threaded hole.

3. The vehicle-mounted camera gimbal servo system according to claim 1, wherein the inertial measurement unit further comprises:
an accelerometer configured to measure the angular displacement information of the camera (11);
a gyroscope configured to measure the angular velocity information of the camera (11); and
a complementary calculation unit configured to perform a quaternion complementary calculation on the angular velocity information measured by the gyroscope to obtain the precise angular velocity information and the angular displacement information measured by the accelerometer to obtain the precise angular displacement information.

4. The vehicle-mounted camera gimbal servo system according to claim 1, wherein the pitch motor, the roll motor, and the yaw motor are all brushless DC motors.

5. A control method of the vehicle-mounted camera gimbal servo system according to claim 1, comprising the following steps:
S1: (a) measuring the angular velocity information and the angular displacement information of the camera (11) by using the inertial measurement unit mounted on the camera (11), and
(b) generating the precise angular velocity information and the precise angular displacement information by using the quaternion complementary filtering algorithm,
S2: (a) establishing three Simulink™ models in each of the three directions of pitch, roll, and yaw according to a mechanical structure of the camera tri-axial gimbal in combination with motor parameters of the pitch motor, the roll motor, and the yaw motor,
(b) generating the IGBT switching sequence information of the drive bridge according to the one or more pitch position sensors in the pitch motor, the one or more yaw position sensors in the yaw motor, and the one or more roll position sensors in the roll motors, (c) generating the IGBT duty cycle of the drive bridge based on the target voltage information, and (d) implementing the open-loop control in the three directions by using the drive bridge to selectively control the speeds of each of the pitch motor, the yaw motor, and the roll motor, and to obtain an actuator control model as a combination of the three Simulink™ control model;

S3: (a) establishing the angular velocity loop controller model in Simulink™ based on the actuator control model, and (b) optimizing first parameters of the angular velocity loop controller model iteratively by using the particle swarm optimization algorithm, wherein the angular velocity loop controller model generates the target voltage information according to the combination of the angular velocity information obtained by the inertial measurement unit and the target angular velocity information; and S4: (a) establishing the angular displacement loop controller model in Simulink™ based on the angular velocity loop controller model, (b) optimizing second parameters of the angular displacement loop controller model by using the particle swarm optimization algorithm, wherein the angular displacement loop controller model generates the target angular velocity information according to the target steering information set by the user and the angular displacement information obtained by the inertial measurement unit, and (c) sending the target angular velocity information to the angular velocity loop controller model to implement the double closed-loop control.

6. The control method of the vehicle-mounted camera gimbal servo system according to claim 5, wherein the counterweight block (13) connected to the pitch arm (4) in the threaded manner comprises the pitch arm (4) having a thread, the counterweight block (13) having a threaded hole, and the thread configured to fit into the threaded hole to connect the pitch arm (4) and the counterweight block (13), wherein a relative position of the counterweight block (13) to the pitch arm (4) is adjustable via changing a relative length of the thread through the threaded hole.

7. The control method of the vehicle-mounted camera gimbal servo system according to claim 5, wherein the inertial measurement unit further comprises:

an accelerometer configured to measure the angular displacement information of the camera (11);

a gyroscope configured to measure the angular velocity information of the camera (11); and a complementary calculation unit configured to perform a quaternion complementary calculation on the angular velocity information measured by the gyroscope to obtain the precise angular velocity information and the angular displacement information measured by the accelerometer to obtain the precise angular displacement information.

8. The control method of the vehicle-mounted camera gimbal servo system according to claim 5, wherein the pitch motor, the roll motor, and the yaw motor are all brushless DC motors.

9. The control method of the vehicle-mounted camera gimbal servo system according to claim 7, wherein step S1 specifically comprises:

for the angular velocity information obtained by the gyroscope, obtaining quaternions of the angular velocity information by solving a quaternion update equation as follows:

$$\begin{pmatrix} \dot{q}_0 \\ \dot{q}_1 \\ \dot{q}_2 \\ \dot{q}_3 \end{pmatrix} = \frac{1}{2} \begin{pmatrix} 0 & -\omega_x & -\omega_y & -\omega_z \\ \omega_x & 0 & \omega_z & -\omega_y \\ \omega_y & -\omega_z & 0 & \omega_z \\ \omega_z & \omega_y & -\omega_x & 0 \end{pmatrix} \begin{pmatrix} q_0 \\ q_1 \\ q_2 \\ q_3 \end{pmatrix} \quad (1)$$

wherein $q_0$, $q_1$, $q_2$, and $q_3$ represent the quaternions of the angular velocity information;

wherein q.dot.0, q.dot.1, q.dot.2, and q.dot.3 are derivatives of the quaternions;

wherein $\omega_x$, $\omega_y$, and $\omega_z$ are an x-axis component, a y-axis component, and a z-axis component of the angular velocity information, respectively;

determining, according to the quaternions of the angular velocity information, a quaternion matrix for transformation from a measured-object coordinate system b to a ground coordinate system R:

$$C_b^R = \begin{pmatrix} T_{11} & T_{12} & T_{13} \\ T_{21} & T_{22} & T_{23} \\ T_{31} & T_{32} & T_{33} \end{pmatrix} = \begin{pmatrix} 1-2(q_2^2+q_3^2) & 2(q_1q_2-q_0q_3) & 2(q_1q_3+q_0q_2) \\ 2(q_1q_2+q_0q_3) & 1-2(q_1^2+q_3^2) & 2(q_2q_3-q_0q_2) \\ 2(q_1q_3-q_0q_2) & 2(q_2q_3+q_0q_1) & 1-2(q_1^2+q_2^2) \end{pmatrix} \quad (2)$$

wherein C is the quaternion matrix;

wherein $T_{11}$, $T_{12}$, $T_{13}$, $T_{21}$, $T_{22}$, $T_{23}$, $T_{13}$, $T_{23}$, and $T_{33}$ are elements of the quaternion matrix;

determining, according to the quaternion matrix, attitude angles as follows:

$$\begin{cases} \theta = \arcsin(T_{32}) \\ \gamma = \arctan\left(-\dfrac{T_{31}}{T_{33}}\right) \\ \psi = \arctan\left(\dfrac{T_{12}}{T_{22}}\right) \end{cases} \quad (3)$$

wherein $\theta$ is a pitch angle, $\gamma$ is a roll angle, and $\Psi$ is a yaw angle;

processing, by using a low-pass filter, the angular displacement information obtained by the accelerometer;

processing, by using a high-pass filter, the attitude angles calculated by the gyroscope; and calculating a weighted sum to obtain the precise angular displacement information;

$$\beta_p = \frac{dt}{dt+\tau} \times \beta_{p1} + \frac{\tau}{dt+\tau} \times \beta_{p2} \quad (4)$$

$$\beta_r = \frac{dt}{dt+\tau} \times \beta_{r1} + \frac{\tau}{dt+\tau} \times \beta_{r2} \quad (5)$$

wherein $\beta_p$, is a first pitch angle in the precise angular displacement information, $\beta_{p1}$ is a second pitch angle value obtained by the accelerometer, $\beta_{p2}=\theta$ is a third pitch angle calculated by the gyroscope, $\beta_r$, is a first roll angle in the precise angular displacement information, $\beta_{r1}$ is a second roll angle value obtained by the accelerometer, $\beta_{r2}=\gamma$ is a third roll angle calculated by the gyroscope, and T is a time constant.

10. The control method of the vehicle-mounted camera gimbal servo system according to claim 9, wherein the counterweight block (13) connected to the pitch arm (4) in the threaded manner comprises the pitch arm (4) having a thread, the counterweight block (13) having-a threaded hole, and the thread configured to fit into the threaded hole to connect the pitch arm (4) and the counterweight block (13), wherein a relative position of the counterweight block (13) to the pitch arm (4) is adjustable via changing a relative length of the thread through the threaded hole.

11. The control method of the vehicle-mounted camera gimbal servo system according to claim 9, wherein the pitch motor, the roll motor, and the yaw motor are all brushless DC motors.

12. The control method of the vehicle-mounted camera gimbal servo system according to claim 10, wherein the pitch motor, the roll motor, and the yaw motor are all brushless DC motors.

13. The control method of the vehicle-mounted camera gimbal servo system according to claim 5, wherein step S2 specifically comprises the following sub-steps:
S201: (a) establishing a three-dimensional model of the camera tri-axial gimbal in SolidWorks™,
(b) configuring a material of the three-dimensional model, and
(c) calculating rotational inertia of load on three rotation shafts;
S202: (a) building the actuator control model in Simulink™, and
(b) configuring the motor parameters, the motor parameters comprising interphase inductance, line resistance, number of pole pairs, viscosity coefficients of the rotation shafts, and the rotational inertia of the load;
S203: (a) building an encoder module in Simulink™, and
(b) calculating the IGBT switching sequence based on information from the one or more pitch position sensors in the pitch motor, the one or more yaw position sensors in the yaw motor, the one or more roll position sensors in the roll motor;
S204: (a) building a Pulse-Width Modulation (PWM) module and a constant voltage power supply module in Simulink™; and
S205: (a) inputting the target voltage information outputted by the angular velocity loop control unit into the three-dimensional model, and
(b) obtain the actuator control model,
wherein $U_{max}$ is a maximum voltage limit, wherein u is the target voltage information, and wherein the target voltage information u satisfies the following condition:

$$\begin{cases} u > -U_{max} \\ u < U_{max} \end{cases}. \quad (6)$$

14. The control method of the vehicle-mounted camera gimbal servo system according to claim 6, wherein step S2 specifically comprises the following sub-steps:
S201: (a) establishing a three-dimensional model of the camera tri-axial gimbal in SolidWorks™,
(b) configuring a material of the three-dimensional model, and
(c) calculating rotational inertia of load on three rotation shafts;
S202: (a) building the actuator control model in Simulink™, and
(b) configuring the motor parameters, the motor parameters comprising interphase inductance, line resistance, number of pole pairs, viscosity coefficients of the rotation shafts, and the rotational inertia of the load;
S203: (a) building an encoder module in Simulink™, and
(b) calculating the IGBT switching sequence based on information from the one or more pitch position sensors in the pitch motor, the one or more yaw position sensors in the yaw motor, the one or more roll position sensors in the roll motor;
S204: (a) building a Pulse-Width Modulation (PWM) module and a constant voltage power supply module in Simulink™; and
S205: (a) inputting the target voltage information outputted by the angular velocity loop control unit into the three-dimensional model,
(b) obtain the actuator control model,
wherein $U_{max}$ is a maximum voltage limit, wherein u is the target voltage information, and wherein the target voltage information u satisfies the following condition:

$$\begin{cases} u > -U_{max} \\ u < U_{max} \end{cases}. \quad (6)$$

15. The control method of the vehicle-mounted camera gimbal servo system according to claim 7, wherein step S2 specifically comprises the following sub-steps:
S201: (a) establishing a three-dimensional model of the camera tri-axial gimbal in SolidWorks™,
(b) configuring a material of the three-dimensional model, and
(c) calculating rotational inertia of load on three rotation shafts;
S202: (a) building the actuator control model in Simulink™, and
(b) configuring the motor parameters, the motor parameters comprising interphase inductance, line resistance, number of pole pairs, viscosity coefficients of the rotation shafts, and the rotational inertia of the load;
S203: (a) building an encoder module in Simulink™, and
(b) calculating the IGBT switching sequence based on information from the one or more pitch position sensors in the pitch motor, the one or more yaw position sensors in the yaw motor, the one or more roll position sensors in the roll motor;
S204: (a) building a Pulse-Width Modulation (PWM) module and a constant voltage power supply module in Simulink™; and
S205: (a) inputting the target voltage information u-outputted by the angular velocity loop control unit into the three-dimensional model, and
(b) obtain the actuator control model,
wherein $U_{max}$ is a maximum voltage limit, wherein u is the target voltage information, and wherein the target voltage information u satisfies the following condition:

$$\begin{cases} u > -U_{max} \\ u < U_{max} \end{cases}. \quad (6)$$

16. The control method of the vehicle-mounted camera gimbal servo system according to claim 8, wherein step S2 specifically comprises the following sub-steps:

S201: (a) establishing a three-dimensional model of the camera tri-axial gimbal in SolidWorks™,
(b) configuring a material of the three-dimensional model, and
(c) calculating rotational inertia of load on three rotation shafts;

S202: (a) building the actuator control model in Simulink™, and
(b) configuring the motor parameters, the motor parameters comprising interphase inductance, line resistance, number of pole pairs, viscosity coefficients of the rotation shafts, and the rotational inertia of the load;

S203: (a) building an encoder module in Simulink™, and
(b) calculating the IGBT switching sequence based on information from the one or more pitch position sensors in the pitch motor, the one or more yaw position sensors in the yaw motor, the one or more roll position sensors in the roll motor;

S204: (a) building a Pulse-Width Modulation (PWM) module and a constant voltage power supply module in Simulink™; and S205: (a) inputting the target voltage information u-outputted by the angular velocity loop control unit into the three-dimensional model, and
(b) obtain the actuator control model,
wherein $U_{max}$ is a maximum voltage limit, wherein u is the target voltage information, and wherein the target voltage information u satisfies the following condition:

$$\begin{cases} u > -U_{max} \\ u < U_{max} \end{cases} \quad (6)$$

17. The control method of the vehicle-mounted camera gimbal servo system according to claim 5, wherein step S3 comprises:
S301: (a) establishing the angular velocity loop controller model in Simulink™,
(b) saving the angular velocity loop controller model in .mdl format,
(c) setting a step target angular velocity in the angular velocity loop controller model in .mdl format,
(d) using parameters of the angular velocity loop controller as a model input, and
(e) using a feedback angular velocity of the step target angular velocity of the angular velocity loop controller model as a model output,
wherein the parameters of the angular velocity loop controller comprise a proportion coefficient $K_p$ and an integral coefficient K;

S302: (a) establishing a Particle Swarm Optimization (PSO) main function in Matlab™, and
(b) setting the number of particle dimensions to 2, the number of particles to 50, and the maximum number of iterations to 100,
wherein in a particle velocity update formula (7), i denotes the i-th particle, k denotes the number of iterations, d denotes the number of dimensions, and x denotes a particle position, pbest and gbest denote an individual historical optimal position and a global optimal position, respectively; $c_1$, and $c_2$ are an individual learning rate and a group learning rate, respectively, $r_1$ and $r_2$ are [0,1], w is an inertia weight, and w decreases linearly from 0.9 to 0.4 to improve search efficiency and reduce a probability of falling into a local optimum, $$v_{id}^k = w \times v_{id}^{k-1} + c_1 \times r_1 \times (pbest_{id} - x_{id}^{k-1}) + c_2 \times r_2 \times (gbest_d - x_{id}^{k-1}) \quad (7)$$

$$x_{id}^k = x_{id}^{k-1} + v_{id}^{k-1} \quad (8)$$

wherein $v_{id}^k$ and $v_{id}^{k-1}$ denote particle velocities of the i-th particle in the d-th dimension during the k-th iteration and the (k−1)-th iteration, respectively, $x_{id}^k$ and $x_{id}^{k-1}$ denote particle positions of the i-th particle in the d-th dimension during the k-th iteration and the (k−1)-th iteration, respectively, $pbest_d$ denotes an individual historical optimal position of the i-th particle in the d-th dimension during the (k−1)-th iteration, and $gbest_d$ denotes a global optimal position in the d-th dimension during the (k−1)-th iteration;

S303: (a) defining a fitness function of the angular velocity loop controller as a weighted sum of an overshoot item and an absolute error value item of the angular velocity loop controller,
wherein the inertia weight of the overshoot item is 0.009, and the inertia weight of the absolute error value item is 1:

$$y_{fit} = w_1 \times \delta + \int w_2 \times |e| \times dt \quad (9)$$

wherein $y_{fit}$ is a fitness function value of the angular velocity loop controller, $w_1$ is a first weight of the overshoot item of the angular velocity loop controller, $w_2$ is a second weight of the absolute error value item of the angular velocity loop controller, $\delta$ is the overshoot item of the angular velocity loop controller, and e is the absolute error value item of the angular velocity loop controller; and S304: (a) calling the angular displacement loop controller model in .mdl format based on a sim( ) command in each iteration to obtain a feedback steering angle of the step target angular velocity of the angular displacement loop controller model corresponding to each particle,
(b) calculating the fitness function value of each particle by using formula (9) according to the feedback steering angle of the step target angular velocity of the angular displacement loop controller model corresponding to each particle,
(c) updating a particle velocity by using formula (7),
(d) updating a particle position by using formula (8),
wherein the particle position and the particle velocity need to satisfy constraint conditions defined by formula (10) and formula (11):

$$\begin{cases} x_{id}^k > -x_{max} \\ x_{id}^k < x_{max} \end{cases} \quad (10)$$

$$\begin{cases} v_{id}^k > -v_{max} \\ v_{id}^k < v_{max} \end{cases} \quad (11)$$

wherein $x_{max}$ is a maximum position limit, and $v_{max}$ is a maximum velocity limit,
(e) performing iterations continuously until the maximum number of iterations, and
(f) obtaining a global optimal position at the maximum number of iterations as an optimal solution of the parameters of the angular velocity loop controller.

18. The control method of the vehicle-mounted camera gimbal servo system according to claim 6, wherein step S3 comprises:
S301: (a) establishing the angular velocity loop controller model in Simulink™, (b) saving the angular velocity loop controller model in .mdl format,
(c) setting a step target angular velocity in the angular velocity loop controller model in .mdl format,
(d) using parameters of the angular velocity loop controller as a model input, and
(e) using a feedback angular velocity of the step target angular velocity of the angular velocity loop controller model as a model output,
wherein the parameters of the angular velocity loop controller comprise a proportion coefficient $K_p$ and an integral coefficient $K_i$;

S302: (a) establishing a Particle Swarm Optimization (PSO) main function in Matlab™, and
(b) setting the number of particle dimensions to 2, the number of particles to 50, and the maximum number of iterations to 100,
wherein in a particle velocity update formula (7), i denotes the i-th particle, k denotes the number of iterations, d denotes the number of dimensions, and x denotes a particle position, pbest and gbest denote an individual historical optimal position and a global optimal position, respectively; $c_1$, and $c_2$ are an individual learning rate and a group learning rate, respectively, $r_1$ and $r_2$ are [0,1], w is an inertia weight, and w decreases linearly from 0.9 to 0.4 to improve search efficiency and reduce a probability of falling into a local optimum, $$v_{id}^k = w \times v_{id}^{k-1} + c_1 \times r_1 \times (\text{pbest}_{id} - x_{id}^{k-1}) + c_2 \times r_2 \times (\text{gbest}_d - x_{id}^{k-1}) \quad (7)$$

$$x_{id}^k = x_{id}^{k-1} + v_{id}^{k-1} \quad (8)$$

wherein $v_{id}^k$ and $v_{id}^{k-1}$ denote particle velocities of the i-th particle in the d-th dimension during the k-th iteration and the (k−1)-th iteration, respectively, $x_{id}^k$ and $x_{id}^{k-1}$ denote particle positions of the i-th particle in the d-th dimension during the k-th iteration and the (k−1)-th iteration, respectively, $\text{pbest}_d$ denotes an individual historical optimal position of the i-th particle in the d-th dimension during the (k−1)-th iteration, and $\text{gbest}_d$ denotes a global optimal position in the d-th dimension during the (k−1)-th iteration;

S303: (a) defining a fitness function of the angular velocity loop controller as a weighted sum of an overshoot item and an absolute error value item of the angular velocity loop controller,
wherein the inertia weight of the overshoot item is 0.009, and the inertia weight of the absolute error value item is 1:

$$y_{fit} = w_1 \times \delta + \int w_2 \times |e| \times dt \quad (9)$$

wherein $y_{fit}$ is a fitness function value of the angular velocity loop controller, $w_1$ is a first weight of the overshoot item of the angular velocity loop controller, $w_2$ is a second weight of the absolute error value item of the angular velocity loop controller, 5 is the overshoot item of the angular velocity loop controller, and e is the absolute error value item of the angular velocity loop controller; and S304: (a) calling the angular displacement loop controller model in .mdl format based on a sim( ) command in each iteration to obtain a feedback steering angle of the step target angular velocity of the angular displacement loop controller model corresponding to each particle,
(b) calculating the fitness function value of each particle by using formula (9) according to the feedback steering angle of the step target angular velocity of the angular displacement loop controller model corresponding to each particle,
(c) updating a particle velocity by using formula (7),
(d) updating a particle position by using formula (8),
wherein the particle position and the particle velocity need to satisfy constraint conditions defined by formula (10) and formula (11):

$$\begin{cases} x_{id}^k > -x_{max} \\ x_{id}^k < x_{max} \end{cases} \quad (10)$$

$$\begin{cases} v_{id}^k > -v_{max} \\ v_{id}^k < v_{max} \end{cases} \quad (11)$$

wherein $x_{max}$ is a maximum position limit, and $v_{max}$ is a maximum velocity limit,
(e) performing iterations continuously until the maximum number of iterations, and
(f) obtaining a global optimal position at the maximum number of iterations as an optimal solution of the parameters of the angular velocity loop controller.

19. The control method of the vehicle-mounted camera gimbal servo system according to claim 7, wherein step S3 comprises:

S301: (a) establishing the angular velocity loop controller model in Simulink™,
(b) saving the angular velocity loop controller model in .mdl format,
(c) setting a step target angular velocity in the angular velocity loop controller model in .mdl format,
(d) using parameters of the angular velocity loop controller as a model input, and
(e) using a feedback angular velocity of the step target angular velocity of the angular velocity loop controller model as a model output,
wherein the parameters of the angular velocity loop controller comprise a proportion coefficient $K_p$ and an integral coefficient K;

S302: (a) establishing a Particle Swarm Optimization (PSO) main function in Matlab™, and
(b) setting the number of particle dimensions to 2, the number of particles to 50, and the maximum number of iterations to 100,
wherein in a particle velocity update formula (7), i denotes the i-th particle, k denotes the number of iterations, d denotes the number of dimensions, and x denotes a particle position, pbest and gbest denote an individual historical optimal position and a global optimal position, respectively; $c_1$, and $c_2$ are an individual learning rate and a group learning rate, respectively, $r_1$ and $r_2$ are [0, 1], w is an inertia weight, and w decreases linearly from 0.9 to 0.4 to improve search efficiency and reduce a probability of falling into a local optimum, $$v_{id}^k = w \times v_{id}^{k-1} + c_1 \times r_1 \times (\text{pbest}_{id} - x_{id}^{k-1}) + c_2 \times r_2 \times (\text{gbest}_d - x_{id}^{k-1}) \quad (7)$$

$$x_{id}^k = x_{id}^{k-1} + v_{id}^{k-1} \quad (8)$$

wherein $v_{id}^k$ and $v_{id}^{k-1}$ denote particle velocities of the i-th particle in the d-th dimension during the k-th iteration and the (k−1)-th iteration, respectively, $x_{id}^k$ and $x_{id}^{k-1}$ denote particle positions of the i-th particle in the d-th dimension during the k-th iteration and the (k−1)-th iteration, respectively, $\text{pbest}_d$ denotes an individual historical optimal position of the i-th particle in the d-th dimension during the (k−1)-th iteration, and gbest$_d$ denotes a global optimal position in the d-th dimension during the (k−1)-th iteration;

S303: (a) defining a fitness function of the angular velocity loop controller as a weighted sum of an overshoot item and an absolute error value item of the angular velocity loop controller, wherein the inertia weight of the overshoot item is 0.009, and the inertia weight of the absolute error value item is 1:

$$y_{fit} = w_1 \times \delta + \int w_2 \times |e| \times dt \qquad (9)$$

wherein $y_{fit}$ is a fitness function value of the angular velocity loop controller, $w_1$ is a first weight of the overshoot item of the angular velocity loop controller, $w_2$ is a second weight of the absolute error value item of the angular velocity loop controller, δ is the overshoot item of the angular velocity loop controller, and e is the absolute error value item of the angular velocity loop controller; and S304: (a) calling the angular displacement loop controller model in .mdl format based on a sim( ) command in each iteration to obtain a feedback steering angle of the step target angular velocity of the angular displacement loop controller model corresponding to each particle, (b) calculating the fitness function value of each particle by using formula (9) according to the feedback steering angle of the step target angular velocity of the angular displacement loop controller model corresponding to each particle, (c) updating a particle velocity by using formula (7), (d) updating a particle position by using formula (8), wherein the particle position and the particle velocity need to satisfy constraint conditions defined by formula (10) and formula (11):

$$\begin{cases} x_{id}^k > -x_{max} \\ x_{id}^k < x_{max} \end{cases} \qquad (10)$$

$$\begin{cases} v_{id}^k > -v_{max} \\ v_{id}^k < v_{max} \end{cases} \qquad (11)$$

wherein $x_{max}$ is a maximum position limit, and $v_{max}$ is a maximum velocity limit, (e) performing iterations continuously until the maximum number of iterations, and (f) obtaining a global optimal position at the maximum number of iterations as an optimal solution of the parameters of the angular velocity loop controller.

20. The control method of the vehicle-mounted camera gimbal servo system according to claim 5, wherein step S4 specifically comprises:

S401: (a) establishing an extended state observer (ESO), wherein a basic process of a second-order ESO discrete system is as follows:

$$e_0 = z_1(k) - y(k) \qquad (12)$$

$$z_1(k+1) = z_1(k) + ts \times (z_2(k) - \beta_{01} \times e_0) \qquad (13)$$

$$z_2(k+1) = z_2(k) + tx \times (z_3(k) - \beta_{02} \times fal(e_0, 0.5, \delta_0) + b \times u) \qquad (14)$$

$$z_3(k+1) = z_3(k) - ts \times \beta_{03} \times fal(e_0, 0.25, \delta_0) \qquad (15)$$

$$fal(e_0, \alpha, \delta_0) = \begin{cases} |e_0|^\alpha \times sign(e_0), & |e_0| > \delta_0 \\ \dfrac{e_0}{\delta_0^{1-\alpha}}, & |e_0| \le \delta_0 \end{cases} \quad (\delta_0 > 0) \qquad (16)$$

wherein $e_o$ is an output error, k denotes moment k, y(k) is an output of the second-order ESO discrete system at moment k, $z_1(k)$, $z_2(k)$, and $z_3(k)$ are observed state vectors at moment k, $z_1(k+1)$, $z_2(k+1)$, and $z_3(k+1)$ are updated observed state vectors at moment k+1, $t_s$ is a step size, $\beta_{01}$, $\beta_{02}$, and $\beta_{03}$ are a first error coefficient, a second error coefficient, and a third error coefficient of the ESO, respectively, a and o are an exponential coefficient and a threshold coefficient of a fal function, respectively, b is a control volume coefficient, fal( ) is the fal function, and u is a control volume outputted by the angular displacement loop controller;

S402: (a) establishing a tracking differentiator (TD), wherein the second-order ESO discrete system TD is established based on fan as follows:

$$fh = fhan(x_1(k) - v(k), x_2(k), r_0, h_0) \qquad (17)$$

$$x_1(k+1) = x_1(k) + ts \times x_2(k) \qquad (18)$$

$$x_2(k+1) = x_2(k) + ts \times fh \qquad (19)$$

wherein v(k) is a control target at moment k, $x_1(k)$ and $x_2(k)$ are tracking control targets at moment K, $x_1(k+1)$ and $x_2(k+1)$ are updated tracking control targets at moment k+1, $t_s$ is a step size, fhan(•) is a fhan function, and an expression of fhan is shown in formula (28):

$$d = r_0 \times h_0^2 \qquad (20)$$

$$a_0 = h_0 \times x_2(k) \qquad (21)$$

$$y = x_1(k) - v(k) + a_0 \qquad (22)$$

$$a_1 = \sqrt{d \times (d + 8 \times |y(k)|)} \qquad (23)$$

$$a_2 = a_0 + sign(y(k)) \times \frac{(a_1 - d)}{2} \qquad (24)$$

$$s_y = \frac{sign(y(k) + d) - sign(y(k) - d)}{2} \qquad (25)$$

$$a = (a_0 + y(k) - a_2) \times s_y + a_2 \qquad (26)$$

$$s_a = \frac{sign(a + d) - sign(a - d)}{2} \qquad (27)$$

$$fhan = -r_0 \times \left[\frac{a}{d} - sign(a)\right] \times s_a - r_0 \times sign(a) \qquad (28)$$

wherein x is an inputted state vector, $r_0$ and $h_0$ are a first set parameter and a second set parameter of the fhan function, and d, $a_0$, $a_1$, $a_2$, $s_y$, a, and $s_a$ are a first intermediate parameter, a second intermediate parameter, a third intermediate parameter, a fourth intermediate parameter, a fifth intermediate parameter, a sixth intermediate parameter, and a seventh intermediate parameter of the fhan function, respectively;

S403: (a) establishing a nonlinear state error feedback (NLSEF) controller, wherein a discrete process of the nonlinear state error feedback controller is as follows:

$$u_0 = K_p \times fal(e_1, a_1, \delta_0) + K_d \times fal(e_2, a_2, \delta_0) \quad (29)$$

$$u = u_0 - \frac{z_3(k+1)}{b_0} \quad (30)$$

wherein $u_0$ is an intermediate parameter of the angular displacement loop controller, u is a control volume outputted by the angular displacement loop controller, $e$ and $e_2$ are two observed state vector errors, $e_1=x_1(k+1)-z_1(k+1)$ and $e_2=x_2(k+1)-z_2(k+1)$, $a_1$ and $a_2$ are two specific values of the exponential coefficient a of the fal function, $b_0$ is a coefficient determined empirically, and $K_p$ and $K_d$ are a proportion coefficient and a differential coefficient, respectively, and are optimized;

S404: (a) saving, in .mdl format, the Simulink™ model of the angular displacement loop controller established through steps 401 to 403 to obtain the angular displacement loop controller model in .mdl format, wherein an input of the angular displacement loop controller model in .mdl format is parameters of the angular displacement loop controller model, an output of the angular displacement loop controller model is a feedback angular displacement of the step target angular displacement and the parameters of the angular displacement loop controller model comprise: a proportion coefficient $K_p$, a differential coefficient $K_d$, and a control volume coefficient b of an angular displacement loop;

S405: (a) establishing a Particle Swarm Optimization (PSO) main function in Matlab, and (b) setting the number of particle dimensions to 2, the number of particles to 50, and the maximum number of iterations to 100, wherein an inertia weight of a particle velocity update formula decreases linearly from 0.9 to 0.4 to improve search efficiency and reduce a probability of falling into a local optimum;

S406: (a) defining a fitness function of the angular displacement loop controller as a weighted sum of an overshoot item of the angular displacement loop controller and an absolute error value item of the angular displacement loop controller, wherein the inertia weight of the overshoot item is 0.009, and the inertia weight of an absolute error value item is 1:

$$y'_{fit} = w'_1 \times \delta' + \int w'_2 \times |e'| \times dt \quad (31)$$

wherein $y_{fit}$, is a fitness function value of the angular velocity loop controller, $w_1$ is a first weight of the overshoot item of the angular velocity loop controller, $w_2$ is a second weight of the absolute error value item of the angular velocity loop controller, $\delta$ is the overshoot item of the angular velocity loop controller, and e is the absolute error value item of the angular velocity loop controller; and S407: (a) calling the Simulink™ model based on a sim( ) command in each iteration to calculate the fitness function value, (b) update a particle velocity, (c) update a particle position, and (d) performing iterations continuously until the maximum number of iterations to obtain optimal solutions of $K_p$, $K_d$, and b.

\* \* \* \* \*